United States Patent
Li et al.

(10) Patent No.: US 11,732,619 B2
(45) Date of Patent: Aug. 22, 2023

(54) EFFICIENT RECYCLING SYSTEM FOR EXHAUST ENERGY OF INTERNAL COMBUSTION ENGINE

(71) Applicant: HUAZHONG UNIVERSITY OF SCIENCE AND TECHNOLOGY, Hubei (CN)

(72) Inventors: Renfu Li, Hubei (CN); Xinguo Lei, Hubei (CN)

(73) Assignee: HUAZHONG UNIVERSITY OF SCIENCE AND TECHNOLOGY., Hubei (CN)

( * ) Notice: Subject to any disclaimer, the term of this patent is extended or adjusted under 35 U.S.C. 154(b) by 0 days.

(21) Appl. No.: 17/431,127

(22) PCT Filed: Nov. 4, 2020

(86) PCT No.: PCT/CN2020/126473
§ 371 (c)(1),
(2) Date: Aug. 13, 2021

(87) PCT Pub. No.: WO2021/088863
PCT Pub. Date: May 14, 2021

(65) Prior Publication Data
US 2022/0259990 A1    Aug. 18, 2022

(30) Foreign Application Priority Data
Nov. 4, 2019 (CN) .............................. 201911064531

(51) Int. Cl.
*F01K 25/10*    (2006.01)
*F01K 23/10*    (2006.01)
(Continued)

(52) U.S. Cl.
CPC .............. *F01K 25/10* (2013.01); *F01K 23/10* (2013.01); *F02B 37/013* (2013.01); *F02B 37/24* (2013.01);
(Continued)

(58) Field of Classification Search
CPC ........ F01K 25/10; F01K 23/10; F01K 23/065; F02B 37/013; F02B 37/24; F02B 37/00;
(Continued)

(56) References Cited

U.S. PATENT DOCUMENTS

2015/0308319 A1* 10/2015 Bau ........................ F02B 37/18
60/605.1
2016/0138432 A1*  5/2016 Son ........................... F02G 5/02
60/645
2021/0172344 A1*  6/2021 Juchymenko ......... F01K 23/101

FOREIGN PATENT DOCUMENTS

CN      102182583 A     9/2011
CN      103742296 A     4/2014
(Continued)

OTHER PUBLICATIONS

International Search Report dated Jan. 27, 2021 re PCT/CN2020/126473 (5 pages).

*Primary Examiner* — Hoang M Nguyen
(74) *Attorney, Agent, or Firm* — Tutunjian & Bitetto, P.C.

(57) ABSTRACT

Disclosed is an efficient recycling system for exhaust energy of an internal combustion engine. Firstly, a thermoelectric generation device recycles high-temperature waste heat energy in the exhaust of the internal combustion engine and recycles high-temperature heat that originally radiates into the ambient atmosphere on the surface of the volute (24). Secondly, pressure energy in the exhaust of the internal combustion engine is efficiently recycled by using a turbocharging device, and the efficiency of the turbocharging device is improved through the graphite sealing device.

(Continued)

Finally, low-temperature waste heat energy in the exhaust of the internal combustion engine is efficiently recycled by using an organic Rankine cycle device. The risk of decomposition caused by the fact that the working medium used by organic Rankine cycle works in a high-temperature environment is avoided, thereby ensuring the cycle efficiency and the working reliability of the organic Rankine cycle.

13 Claims, 3 Drawing Sheets

(51) Int. Cl.
*F02B 37/013* (2006.01)
*F02B 37/24* (2006.01)
*F01K 23/06* (2006.01)
*F01N 5/02* (2006.01)
*F02G 5/02* (2006.01)

(52) U.S. Cl.
CPC ............ *F01K 23/065* (2013.01); *F01N 5/025* (2013.01); *F02G 5/02* (2013.01)

(58) Field of Classification Search
CPC .......... F01N 5/025; F01N 3/0234; F01N 5/02; F02G 5/02; Y02T 10/12; F01D 11/003; F01D 25/12
USPC ........................................ 60/605.1, 612, 618
See application file for complete search history.

(56) References Cited

FOREIGN PATENT DOCUMENTS

| | | |
|---|---|---|
| CN | 104265502 A | 1/2015 |
| CN | 110792491 A | 2/2020 |
| JP | 2007039513 A | 9/2007 |
| JP | 2009097391 A | 5/2009 |

* cited by examiner

EFFICIENT RECYCLING SYSTEM FOR EXHAUST ENERGY OF INTERNAL COMBUSTION ENGINE

CROSS REFERENCE TO RELATED APPLICATION

This patent application is a U.S. National Stage filing of, and claims priority to and all advantages of, PCT Patent Publication Number PCT/CN2020/126473 filed on Nov. 4, 2020 and Chinese Patent Application No. 2019110645316 filed on Nov. 4, 2019, the contents of both of which are incorporated herein by reference in their entireties.

TECHNICAL FIELD

The present disclosure relates to the field of recycling of exhaust energy of an internal combustion engine, and in particular, to an efficient recycling system for exhaust energy of an internal combustion engine.

BACKGROUND ART

In recent years, with increasingly serious problems of energy depletion, environmental pollution, and the like, energy conservation and emission reduction of internal combustion engines for vehicles have become concerned issues all over the world. In a working process of an internal combustion engine, the exhaust emitted into ambient atmosphere will take away about 35% of energy of total fuel, which is wasted without utilizing. Therefore, the recycling of exhaust energy of the internal combustion engine is an important method for realizing energy conservation and emission reduction, and reducing the fuel consumption rate of the internal combustion engine.

The exhaust energy of the internal combustion engine mainly includes two types, namely, pressure energy and waste heat energy. A turbocharging technology is mainly used for recycling the pressure energy, and a thermoelectric generation technology and organic Rankine cycle are mainly used for recycling the waste heat energy.

The turbocharging technology is an important technical means for improving the economy of the internal combustion engine and reducing the emission of harmful substances. A turbocharging system mainly includes a turbine and an air compressor. The pressure energy in the exhaust of the internal combustion engine drives the turbine to rotate at a high speed. The turbine drives the air compressor to compress and do work, so as to compress air and provide high-pressure air for the internal combustion engine. Therefore, the efficiency of the turbine affects of the work doing capacity of the air compressor, so as to affect the heat efficiency of the internal combustion engine. At present, in order to adapt to the characteristics of pulse exhaust of the internal combustion engine and improve the efficiency of the turbine, turbocharging systems all use adjustable geometric turbines, that is, guide vanes (vanes) of the turbines can be automatically adjusted according to the exhaust characteristics of the internal combustion engine. Because a guide vane is adjustable, there are clearances between two ends of the guide vane and a wall surface, as shown in FIG. 1. Strong clearance leakage flow is produced inevitably due to the existence of the clearances when air flow flows through the guide vane. The clearance leakage flow will increase flow loss, which greatly reduces the efficiency of the turbine. Therefore, the existence of the clearances of the guide vane will reduce the heat efficiency of the internal combustion engine and increase the fuel consumption rate.

A volute of the turbine in the turbocharging system is commonly made of a cast iron material. The cast iron material has good heat resistance, so that the volute can withstand a high temperature. At present, the connection mode of the turbocharging system and the internal combustion engine is that the volute of the turbine is directly connected to an outlet of an exhaust manifold of the internal combustion engine. The temperature of the waste heat energy of the exhaust of the internal combustion engine is high (600° C. to 700° C.), so the temperature of the surface of the volute is also high (about 350° C.) under the action of heat transfer. This part of heat on the surface of the volute will directly radiate to the ambient atmosphere to be wasted.

An organic Rankine cycle system is one of the most effective technical means for recycling the waste heat energy of the exhaust of the internal combustion engine. The organic Rankine cycle technology uses a low-boiling point organic working medium to perform heat exchange with industrial waste heat resources. The low-boiling point organic working medium is converted into high-temperature high-pressure working medium steam, and the working medium steam expands and does do work in a turbo-expander to push the turbine to rotate, thereby outputting shaft work. However, the organic working medium circulates in a long-term medium and low temperature environment, so its working medium will be thermally decomposed inevitably, thereby resulting that system performance deviates from design conditions. Generally, the decomposition temperature of the working medium used by the organic Rankine cycle is lower than 350° C., while the exhaust temperature of the internal combustion engine is generally up to 600 to 700° C. Therefore, high waste heat temperature may cause the decomposition of the working medium of the organic Rankine cycle, thereby resulting in the reduction of the cycle efficiency of the organic Rankine cycle and the reduction of the work reliability. This is one of the most factors that restricts the recycling of the waste heat energy of high-temperature exhaust by the organic Rankine cycle system.

In conclusion, efficient recycling of the energy is not realized no matter using the turbocharging system or the organic Rankine cycle system.

SUMMARY

The objective of the present disclosure is to provide an efficient recycling system for exhaust energy of an internal combustion engine, which can solve the technical problem that neither the existing turbocharging system nor the organic Rankine cycle system realizes efficient recycling of the exhaust energy of the internal combustion engine.

To achieve the above objective, the present disclosure provides the following solutions:

An efficient recycling system for exhaust energy of an internal combustion engine, includes: a thermoelectric generation device, a turbocharging device, and an organic Rankine cycle device.

The thermoelectric generation device includes a radiator (2), a thermoelectric generator (3), a water tank (8), and a water pump (9). The turbocharging device includes an adjustable geometric turbine (10), an air compressor (11), and a first intercooler (12). The organic Rankine cycle device includes an organic working medium pump (14), an organic working medium liquid storage tank (15), an evaporator (13), a third expander (17), and a second condenser (16).

The radiator (2) is located between an outlet of an exhaust manifold of the internal combustion engine and an inlet of the adjustable geometric turbine (10). The water pump (9) is connected to the water tank (8), and is used for pumping water out from the water tank (8) and pressurizing the water into high-pressure liquid water. The high-pressure liquid water flows through each of the surface of the volute of the adjustable geometric turbine (10) and the surface of the radiator (2) to perform heat exchange, and is heated into high-temperature high-pressure steam. The high-temperature high-pressure steam serves as a heat source of the thermoelectric generator (3).

The air compressor (11) is coaxially connected to the adjustable geometric turbine (10). After the exhaust of the internal combustion engine passes through the radiator (2), high-pressure fuel expands and does work in the adjustable geometric turbine (10), and drives the air compressor (11) to rotate to do work, so as to generate high-pressure high-temperature air. The high-pressure high-temperature air enters the internal combustion engine to do work cyclically after being cooled in the first intercooler (12). Part high-pressure low-temperature air flowing out from the first intercooler (12) serves as a cold source of the thermoelectric generator (3).

The organic working medium pump (14) is connected to the organic working medium liquid storage tank (15), and is used for pumping an organic working medium out from the organic working medium liquid storage tank (15) and pressurizing the organic working medium into a high-pressure liquid working medium. The high-pressure liquid working medium flows into the evaporator (13) to perform heat exchange with low-temperature exhaust emitted from the adjustable geometric turbine (10), and is heated into a high-temperature high-pressure gas working medium. The high-temperature high-pressure gas working medium enters the third expander (17) to expand and do work. A low-temperature low-pressure gas working medium obtained after expanding and doing work in the third expander (17) enters the second condenser (16) to be cooled into a liquid working medium, and the liquid working medium flows into the organic working medium liquid storage tank (15), thereby completing one-time work doing cycle of the system.

Optionally, the turbocharging device further includes: a graphite sealing device.

The graphite sealing device includes a graphite sealing ring (21) on a support plate (25) side, and a graphite sealing ring (23) on a volute (24) side.

The graphite sealing ring (21) is located in a graphite ring mounting groove on the support plate (25). The graphite sealing ring (25) is provided with a plurality of through holes (28) which are used for mounting rotating shaft (29) of the guide vane (22). The graphite sealing ring (23) is located in a graphite ring mounting groove on the volute (24). The graphite sealing ring (21) and the graphite sealing ring (23) are respectively located on the two sides of the guide vane (22) and are in rigid friction contact with the guide vane (22) for sealing the clearances between the guide vane and the wall surface in a contact manner.

Optionally, cooling air passages (210) are formed in the bottom surfaces of the mounting grooves of the graphite sealing ring (21) and the graphite sealing ring (23). Part high-pressure low-temperature air from the first intercooler (12) flows into the cooling air passages (210) from inlets (26), flows into the adjustable geometric turbine (10) from outlets (27) after cooling the graphite sealing ring (21) and the graphite sealing ring (23), and does work after being mixed with the high-pressure fuel in the adjustable geometric turbine (10).

Optionally, the thermoelectric generation device further includes: a first expander (4), a second expander (5), and an electric generator (6).

The high-temperature high-pressure steam of the heat source drives the first expander (4) to expand and do work and drives the electric generator (6) to generate electricity after passing through the thermoelectric generator (3). The high-pressure low-temperature air of the cold source drives the second expander (5) to expand and do work and drives the electric generator (6) to generate electricity after passing through the thermoelectric generator (3). The air flowing out from the second expander (5) becomes exhaust and is directly emitted into the atmosphere.

Optionally, the thermoelectric generation device further includes a first condenser (7).

The first condenser (7) is located between the first expander (4) and the water tank (8). The low-temperature low-pressure gas water flowing out from the first expander (4) becomes normal-temperature normal-pressure liquid water after passing through the first condenser (7) and flows back into the water tank (8), thereby completing one-time work doing cycle.

Optionally, the organic Rankine cycle device further includes: a compressor (18) and a second intercooler (19).

The compressor (18) is coaxially connected to the third expander (17). The third expander (17) does work to drive the compressor (18) to rotate to do work and generate high-pressure high-temperature air. The high-pressure high-temperature air becomes high-pressure low-temperature air after passing through the second intercooler (19), and the high-pressure low-temperature air flows into the air compressor (11) of the turbocharging device to be compressed again to form a two-stage compression system.

Optionally, the first expander (4) and the second expander (5) are connected in series.

According to the specific embodiments provided by the present disclosure, the present disclosure discloses the following technical effects:

(1) The present disclosure recycles the high-temperature waste heat energy, pressure energy, and low-temperature waste heat energy in the exhaust of the internal combustion engine through optimized combination of the thermoelectric generation device, the efficient turbocharging device, and the organic Rankine cycle device, which realizes comprehensive efficient gradient recycling of the energy, thereby improving the heat efficiency of the overall internal combustion engine. This is of great significance for energy conservation and emission reduction of the internal combustion engine.

(2) Efficient recycling of the high-temperature waste heat energy in the exhaust of the internal combustion engine is realized by using the thermoelectric generation device, and meanwhile, high-temperature heat that originally radiates into the ambient atmosphere of the surface of the volute of the turbine is recycled through the thermoelectric generation device, thereby improving the utilization rate of the energy.

(3) Efficient utilization of the pressure energy in the exhaust of the internal combustion engine is realized through the turbocharging device, and meanwhile, the graphite sealing device is used, which improves the efficiency of the turbine, thereby improving the work doing capacity of the air compressor and the heat efficiency of the internal combustion engine.

(4) Efficient recycling of the low-temperature waste heat energy in the exhaust of the internal combustion engine is realized by using the organic Rankine cycle device. The temperature of the high-temperature waste heat energy in the exhaust of the internal combustion engine has been greatly reduced to become low-temperature waste heat energy through the actions of the thermoelectric generation device and the turbocharging device, so the risk of decomposition caused by the fact that the working medium used by the organic Rankine cycle works in a high-temperature environment is avoided, thereby ensuring the cycle efficiency and the working reliability of the organic Rankine cycle.

BRIEF DESCRIPTION OF THE DRAWINGS

The present disclosure will be further described below with reference to the accompanying drawings.

REFERENCE SIGNS IN DRAWINGS

1—internal combustion engine cylinder; 2—efficient radiator; 3—thermoelectric generator; 4—first expander; 5—second expander; 6—electric generator; 7—first condenser; 8—water tank; 9—water pump; 10—turbine; 11—air compressor; 12—first intercooler; 13—evaporator; 14—organic working medium pump; 15—organic working medium liquid storage tank; 16—second condenser; 17—third expander; 18—compressor; 19—second intercooler; 21—graphite sealing ring on support plate side; 22—guide vane; 23—graphite sealing ring volute side; 24—volute; 25—support plate; 26—cooling air inlet; 27—cooling air outlet; 28—through hole; 29—guide vane rotating shaft; 210—cooling air passage.

DETAILED DESCRIPTION OF THE EMBODIMENTS

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

The objective of the present disclosure is to provide an efficient recycling system for exhaust energy of an internal combustion engine, which can solve the technical problem that neither the existing turbocharging system nor the organic Rankine cycle system realizes high recycling of the exhaust energy of the internal combustion engine.

In order to make the above objective, features, and advantages of the present disclosure more apparent and more comprehensible, the present disclosure is further described in detail below with reference to the accompanying drawings and specific implementation manners.

Figure 1:
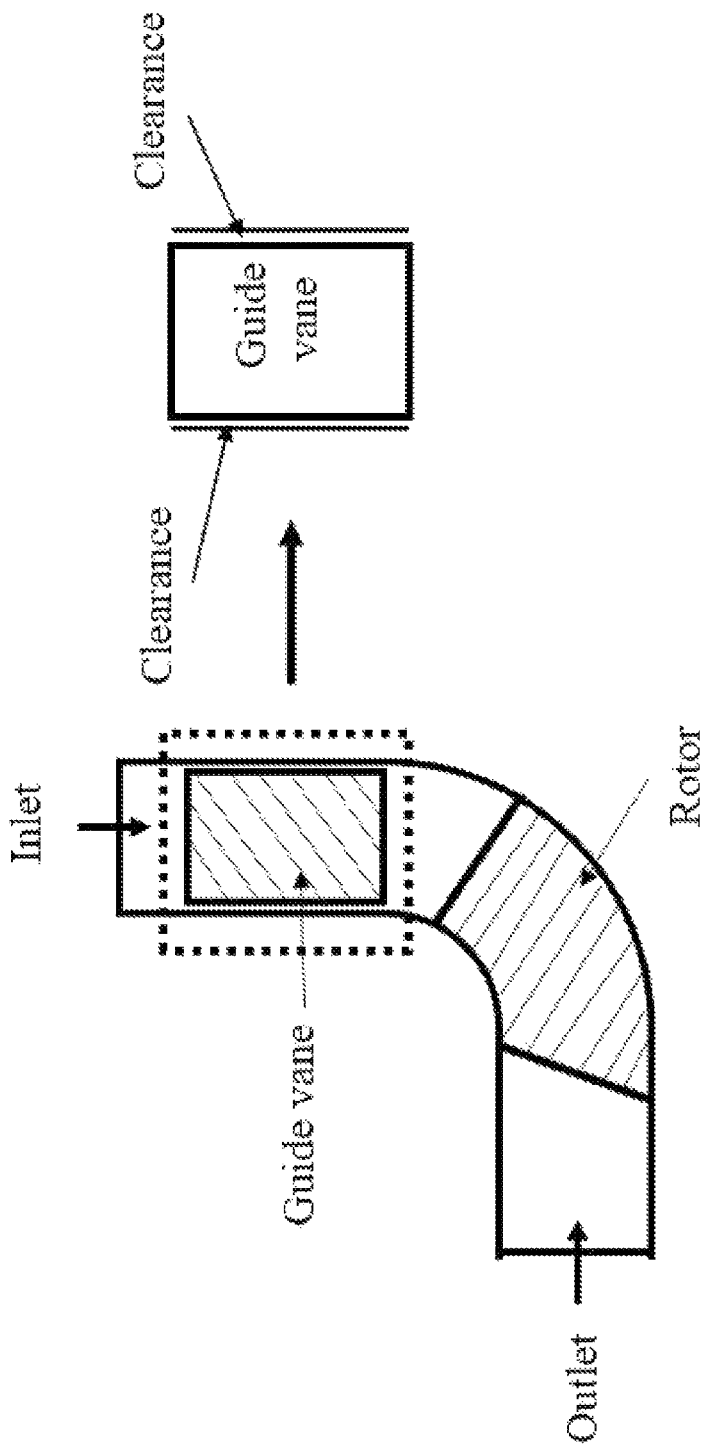
FIG. 1 is a schematic diagram of a clearance of a turbine provided by the embodiment of the present disclosure.
Figure 2:
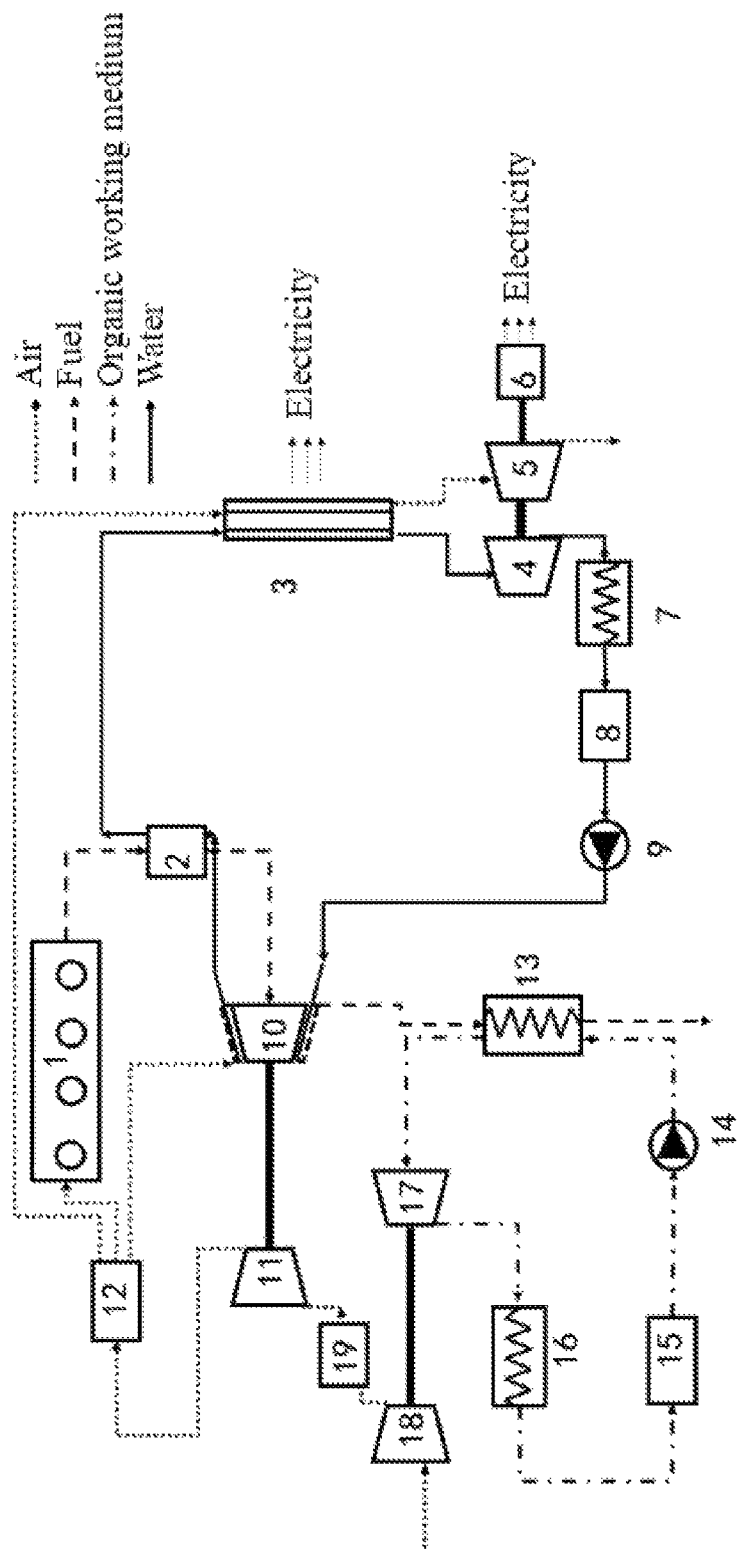
FIG. 2 is a schematic diagram of a recycling system for energy exhaust of an internal combustion engine provided by the embodiment of the present disclosure.

FIG. 2 is a schematic structural diagram of an efficient recycling system for exhaust energy of an internal combustion engine provided by the embodiment of the present disclosure. As shown in FIG. 2, the recycling system for the exhaust energy of the internal combustion engine of the present disclosure mainly includes: a thermoelectric generation device, a turbocharging device, and an organic Rankine cycle device.

An internal combustion engine cylinder 1 will emit high-temperature high-pressure exhaust in a working process. First, the thermoelectric device is used for recycling the high-temperature waste heat energy in the exhaust of the internal combustion engine, and simultaneously recycling the heat that originally radiates into the ambient atmosphere of the surface of the volute of the turbine.

In the embodiment of the present disclosure, the thermoelectric generation device mainly includes: an efficient radiator 2, a thermoelectric generator 3, a first expander 4, a second expander 5, an electric generator 6, a first condenser 7, a water tank 8, a water pump 9, and the like. The high-temperature exhaust emitted from the internal combustion engine cylinder 1 radiates through the efficient radiator 2 first, and the efficient radiator 2 will transfer the high-temperature heat out from the exhaust as much as possible without losing the pressure energy of the exhaust of the internal combustion engine. The water pump 9 is connected to the water tank 8, and is used for pumping water out from the water tank 8 and pressurizing the water into high-pressure liquid water. The high-pressure liquid water first flows through the surface of the volute of the turbine 10 to perform heat exchange, and forms high-pressure steam after absorbing the heat that originally radiates into the ambient atmosphere on the surface of the volute of the turbine 10; then, the high-pressure steam flows through the surface of the efficient radiator 2 to perform further heat exchange to form high-temperature high-pressure steam. The high-temperature high-pressure steam serves as a heat source of the thermoelectric generator 3. The cold source of the thermoelectric generator 3 is from part high-pressure low-temperature air flowing out from the first intercooler 12 in the turbocharging device. Under the actions of the cold source and the heat source, the thermoelectric generator 3 generates electricity and outputs electricity. High-temperature high-pressure steam of the heat source still has certain pressure energy after passing through the thermoelectric generator 3, so that the first expander 4 can be driven to expand and do work and the electric generator 6 is driven to generate electricity. Meanwhile, the high-pressure low-temperature air of the cold source still has certain pressure energy after passing through the thermoelectric generator 3, and can also drive the second expander 5 to expand and do work and the electric generator 6 is driven to generate electricity. In order to improve the electricity generation efficiency of the electric generator 6, the first expander 4 and the second expander 5 are connected in series, so as to increase the torque input into a shaft of the electric generator 6. The air flowing out from the second expander 5 becomes exhaust and is directly into the atmosphere. The low-temperature low-pressure gas water flowing out from the first expander 4 becomes normal-temperature normal-pressure liquid water after passing through the first condenser 7 and flows back into the water tank 8, thereby completing one-time work doing cycle.

After the exhaust of the internal combustion engine passes through the efficient radiator 2, the pressure energy in the exhaust is recycled by using the turbocharging device.

In the embodiment of the present disclosure, the turbocharging device includes a turbine 10, an air compressor 11, a first intercooler 12, a graphite sealing device, and the like. The turbine 10 is connected downstream of the efficient radiator 2. The air compressor 11 is coaxially connected to the turbine 10. The high-pressure fuel flowing out from the efficient radiator 2 expands and does work in the turbine 10 and drives the air compressor 11 to rotate and do work, so as to generate high-pressure high-temperature air. The first intercooler 12 is connected downstream the air compressor 11. The high-pressure high-temperature air becomes high-pressure low-temperature air after passing through the first intercooler 12, and flows into the internal combustion engine cylinder 1 to do work cyclically.

In order to improve the efficiency of the turbine, the clearances between the guide vane and the wall surface are sealed by using the graphite sealing device in the embodiment of the present disclosure.

Figure 3:
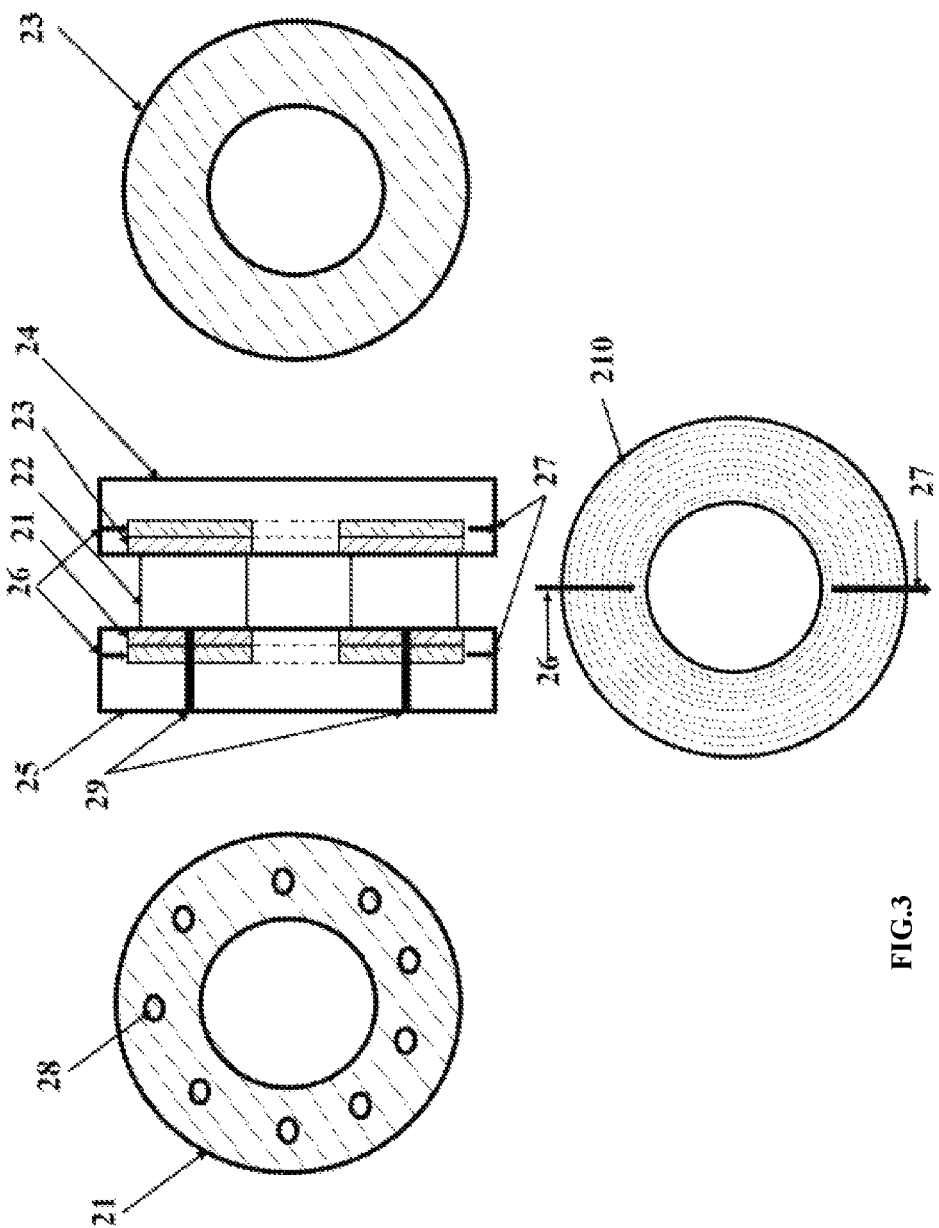
FIG. 3 is a schematic diagram of a graphite sealing device provided by the embodiment of the present disclosure.

In the embodiment of the present disclosure, as shown in FIG. 3, the graphite sealing device includes a graphite sealing ring 21 on a support plate 25 side, and a graphite sealing ring 23 on a volute 24 side, a cooling air inlet 26, a cooling air passage 210, a cooling air outlet 27, and the like. A graphite ring mounting groove is formed in the support plate 25, and is used for mounting the graphite sealing ring 21. The graphite sealing ring 21 is provided with a plurality of through holes 28 which are used for mounting rotating shafts 29 of the guide vane 22. Similarly, a graphite ring mounting groove is formed in the volute 24, and is used for mounting the graphite sealing ring 23. The graphite sealing ring 21 and the graphite sealing ring 23 are respectively located on the two sides of the guide vane 22, and the graphite sealing ring 21 and the graphite sealing ring 23 are in rigid friction contact with the guide vane 22, and are used for sealing the clearances between the guide vane and the wall surface in a contact manner. Graphite restrains clearance leakage flow at the two ends of the guide vane without affecting the free rotation of the guide vane due to the advantages of self-lubrication, small friction coefficient, and the like. Meanwhile, cooling air passages 210 are formed in the bottom surfaces of the mounting grooves of the graphite sealing ring 21 and the graphite sealing ring 23, and are used for performing air cooling on the graphite sealing ring 21 and the graphite sealing ring 23. Cooling air is from part high-pressure low-temperature air after passing through the first intercooler 12. The cooling air flows into the cooling air passages 210 from inlets 26, flows into the turbine 10 from outlets 27 after cooling the graphite sealing ring 21 and the graphite sealing ring 23, and does work after being mixed with the high-pressure fuel in the turbine 10.

The pressure energy in the exhaust has been fully utilized after the exhaust of the internal combustion engine passes through the thermoelectric generation device and the turbocharging device, while the high-temperature waste heat energy becomes low-temperature waste heat energy, so there is still part heat energy not utilized. Therefore, low-temperature waste heat energy in the exhaust is recycled by using the organic Rankine cycle device at the outlet of the turbine 10 of the turbocharging device.

In the embodiment of the present disclosure, the organic Rankine cycle device includes an organic working medium pump 14, an organic working medium liquid storage tank 15 (the working medium includes but is not limited to R245fa), an evaporator 13, a third expander 17, a second condenser 16, a compressor 18, a second intercooler 19, and the like. The organic working medium pump 14 is connected to the organic working medium liquid storage tank 15, and is used for pumping an organic working medium out and pressurizing the organic working medium into a high-pressure liquid working medium. The evaporator 13 is connected downstream the organic working medium pump 14. The high-pressure liquid working medium flows into the evaporator 13 to perform heat exchange with the low-temperature fuel emitted from the turbine, so as to be heated into high-temperature high-pressure steam. The low-temperature fuel becomes exhaust and is directly emitted into the ambient atmosphere after passing through the evaporator 13. The third expander 17 is connected downstream the evaporator 13. A high-temperature high-pressure gas organic working medium enters the third expander 17 to expand and do work, and simultaneously becomes a low-temperature low-pressure gas organic working medium. The compressor 18 is coaxially connected to the third expander 17. The third expander 17 does work to drive the compressor 18 to rotate to do work and generate high-pressure high-temperature air. The second intercooler 19 is mounted downstream the compressor 18. The high-pressure high-temperature air at the outlet of the compressor 18 becomes high-pressure low-temperature air after passing through the second intercooler 19, and flows into the air compressor 11 of the turbocharging device to be compressed again to form a two-stage compression system. The second condenser 16 is connected downstream the third expander 17. The low-temperature low-pressure gas organic working medium flowing out from the third expander 17 becomes a normal-temperature normal-pressure liquid organic working medium after being cooled through the second condenser 16, and flows back into the organic working medium liquid storage tank 15, thereby completing one-time work doing cycle. The organic Rankine cycle device works in a low-temperature waste heat energy environment, which greatly reduces the risk of decomposition of the working medium used in a working process, thereby ensuring the cycle efficiency and the working reliability of the organic Rankine cycle.

The present disclosure recycles realizes comprehensive efficient gradient recycling of the pressure energy and the waste heat energy in the exhaust of the internal combustion engine through optimized combination of the thermoelectric generation device, the efficient turbocharging device, and the organic Rankine cycle device, so that the energy utilization rate is improved, thereby achieving the purposes of saving energy and reducing emission.

The implementation manner of the present disclosure is described in detail in combination with the accompanying drawings above, but the present disclosure is not limited to the above implementation manner. Within the scope of knowledge possessed by those of ordinary skill in the art, various changes can be made without departing from the purpose of the present disclosure.

What is claimed is:

1. An efficient recycling system for exhaust energy of an internal combustion engine, comprising: a thermoelectric generation device, a turbocharging device, and an organic Rankine cycle device, wherein the thermoelectric generation device comprises a radiator (2), a thermoelectric generator (3), a water tank (8), and a water pump (9); the turbocharging device comprises an adjustable geometric turbine (10), an air compressor (11), and a first intercooler (12); the organic Rankine cycle device comprises an organic working medium pump (14), an organic working medium liquid storage tank (15), an evaporator (13), a third expander (17), and a second condenser (16);

the radiator (2) is located between the outlet of an exhaust manifold of the internal combustion engine and the inlet of the adjustable geometric turbine (10); the water pump (9) is connected to the water tank (8), and is used for pumping water out from the water tank (8) and pressurizing the water into high-pressure liquid water; the high-pressure liquid water flows through each of the surface of the volute of the adjustable geometric turbine (10) and the surface of the radiator (2) to perform heat exchange, and is heated into high-temperature high-pressure steam; the high-temperature high-pressure steam serves as a heat source of the thermoelectric generator (3);

the air compressor (11) is coaxially connected to the adjustable geometric turbine (10); after the exhaust of the internal combustion engine passes through the radiator (2), high-pressure fuel expands and does work in the adjustable geometric turbine (10), and drives the air compressor (11) to rotate to do work, so as to generate high-pressure high-temperature air; the high-pressure high-temperature air enters the internal combustion engine to do work cyclically after being cooled in the first intercooler (12); part high-pressure low-temperature air flows out from the first intercooler (12) serves as a cold source of the thermoelectric generator (3);

the organic working medium pump (14) is connected to the organic working medium liquid storage tank (15), and is used for pumping an organic working medium out from the organic working medium liquid storage tank (15) and pressurizing the organic working medium into a high-pressure liquid working medium; the high-pressure liquid working medium flows into the evaporator (13) to perform heat exchange with the low-temperature exhaust emitted from the adjustable geometric turbine (10), and is heated into a high-temperature high-pressure gas working medium; the high-temperature high-pressure gas working medium enters the third expander (17) to expand and do work; a low-temperature low-pressure gas working medium obtained after expanding and doing work in the third expander (17) enters the second condenser (16) to be cooled into a liquid working medium, and flows into the organic working medium liquid storage tank (15), thereby completing one-time work doing cycle of the system.

2. The efficient recycling system for exhaust energy of an internal combustion engine according to claim 1, wherein the turbocharging device further comprises a graphite sealing device;

the graphite sealing device comprises a first graphite sealing ring (21) on a support plate (25) side, and a second graphite sealing ring (23) on a volute (24) side; the first graphite sealing ring (21) is located in a graphite ring mounting groove on the support plate (25); the first graphite sealing ring (21) is provided with a plurality of through holes (28) which are used for mounting rotating shafts (29) of the guide vane (22); the second graphite sealing ring (23) is located in a graphite ring mounting groove on the volute (24); the first graphite sealing ring (21) and the second graphite sealing ring (23) are respectively located on the two sides of the guide vane (22) and are in rigid friction contact with the guide vane (22) for sealing the clearances between the guide vane and the wall surface in a contact manner.

3. The efficient recycling system for exhaust energy of an internal combustion engine according to claim 2, wherein cooling air passages (210) are formed in the bottom surfaces of the mounting grooves of the first graphite sealing ring (21) and the second graphite sealing ring (23); part high-pressure low-temperature air from the first intercooler (12) flows into the cooling air passages (210) from inlets (26), flows into the adjustable geometric turbine (10) from outlets (27) after cooling the first graphite sealing ring (21) and the second graphite sealing ring (23), and does work after being mixed with the high-pressure fuel in the adjustable geometric turbine (10).

4. The efficient recycling system for exhaust energy of an internal combustion engine according to claim 1, wherein the thermoelectric generation device further comprises: a first expander (4), a second expander (5), and an electric generator (6);

the high-temperature high-pressure steam of the heat source drives the first expander (4) to expand and do work and drives the electric generator (6) to generate electricity after passing through the thermoelectric generator (3); the high-pressure low-temperature air of the cold source drives the second expander (5) to expand, do work, and drives the electric generator (6) to generate electricity after passing through the thermoelectric generator (3); the air flowing out from the second expander (5) becomes exhaust and is directly emitted into the atmosphere.

5. The efficient recycling system for exhaust energy of an internal combustion engine according to claim 2, wherein the thermoelectric generation device further comprises: a first expander (4), a second expander (5), and an electric generator (6);

the high-temperature high-pressure steam of the heat source drives the first expander (4) to expand and do work and drives the electric generator (6) to generate electricity after passing through the thermoelectric generator (3); the high-pressure low-temperature air of the cold source drives the second expander (5) to expand, do work, and drives the electric generator (6) to generate electricity after passing through the thermoelectric generator (3); the air flowing out from the second expander (5) becomes exhaust and is directly emitted into the atmosphere.

6. The efficient recycling system for exhaust energy of an internal combustion engine according to claim 3, wherein the thermoelectric generation device further comprises: a first expander (4), a second expander (5), and an electric generator (6);

the high-temperature high-pressure steam of the heat source drives the first expander (4) to expand and do work and drives the electric generator (6) to generate electricity after passing through the thermoelectric generator (3); the high-pressure low-temperature air of the cold source drives the second expander (5) to expand, do work, and drives the electric generator (6) to generate electricity after passing through the thermoelectric generator (3); the air flowing out from the second expander (5) becomes exhaust and is directly emitted into the atmosphere.

7. The efficient recycling system for exhaust energy of an internal combustion engine according to claim 4, wherein the thermoelectric generation device further comprises a first condenser (7);

the first condenser (7) is located between the first expander (4) and the water tank (8); the low-temperature low-pressure gas water flowing out from the first expander (4) becomes normal-temperature normal-pressure liquid water after passing through the first condenser (7) and flows back into the water tank (8), thereby completing one-time work doing cycle.

8. The efficient recycling system for exhaust energy of an internal combustion engine according to claim 5, wherein the thermoelectric generation device further comprises a first condenser (7);

the first condenser (7) is located between the first expander (4) and the water tank (8); the low-temperature low-pressure gas water flowing out from the first expander (4) becomes normal-temperature normal-pressure liquid water after passing through the first condenser (7) and flows back into the water tank (8), thereby completing one-time work doing cycle.

9. The efficient recycling system for exhaust energy of an internal combustion engine according to claim 6, wherein the thermoelectric generation device further comprises a first condenser (7);

the first condenser (7) is located between the first expander (4) and the water tank (8); the low-temperature low-pressure gas water flowing out from the first expander (4) becomes normal-temperature normal-pressure liquid water after passing through the first condenser (7) and flows back into the water tank (8), thereby completing one-time work doing cycle.

10. The efficient recycling system for exhaust energy of an internal combustion engine according to claim 1, wherein the organic Rankine cycle device further comprises: a compressor (18) and a second intercooler (19);

the compressor (18) is coaxially connected to the third expander (17); the third expander (17) does work to drive the compressor (18) to rotate to do work and generate high-pressure high-temperature air; the high-pressure high-temperature air becomes high-pressure low-temperature air after passing through the second intercooler (19), and the high-pressure low-temperature air flows into the air compressor (11) of the turbocharging device to be compressed again to form a two-stage compression system.

11. The efficient recycling system for exhaust energy of an internal combustion engine according to claim 4, wherein the first expander (4) and the second expander (5) are connected in series.

12. The efficient recycling system for exhaust energy of an internal combustion engine according to claim 5, wherein the first expander (4) and the second expander (5) are connected in series.

13. The efficient recycling system for exhaust energy of an internal combustion engine according to claim 6, wherein the first expander (4) and the second expander (5) are connected in series.

* * * * *